United States Patent
Ho et al.

(10) Patent No.: US 8,179,969 B2
(45) Date of Patent: May 15, 2012

(54) METHOD AND APPARATUS FOR ENCODING OR DECODING FRAMES OF DIFFERENT VIEWS IN MULTIVIEW VIDEO USING GLOBAL DISPARITY

(75) Inventors: Yo Sung Ho, Gwangju (KR); Kwan Jung Oh, Gwangju (KR)

(73) Assignees: Gwangju Institute of Science and Technology, Gwangju (KR); KT Corporation, Seongnam (KR)

( * ) Notice: Subject to any disclaimer, the term of this patent is extended or adjusted under 35 U.S.C. 154(b) by 505 days.

(21) Appl. No.: 12/377,985

(22) PCT Filed: Aug. 17, 2007

(86) PCT No.: PCT/KR2007/003950
§ 371 (c)(1),
(2), (4) Date: Mar. 30, 2009

(87) PCT Pub. No.: WO2008/020734
PCT Pub. Date: Feb. 21, 2008

(65) Prior Publication Data
US 2010/0166074 A1    Jul. 1, 2010

(30) Foreign Application Priority Data
Aug. 18, 2006   (KR) .................. 10-2006-0078131

(51) Int. Cl.
*H04N 7/12*    (2006.01)
*G06K 9/36*    (2006.01)
(52) U.S. Cl. ............ 375/240.16; 382/232; 382/236
(58) Field of Classification Search ......... 375/240.16, 375/240.01, 240.12; 382/232, 236; *H04N 7/12*
See application file for complete search history.

(56) References Cited

U.S. PATENT DOCUMENTS

| | | | |
|---|---|---|---|
| 2003/0202592 A1 | 10/2003 | Sohn et al. | |
| 2007/0041443 A1 | 2/2007 | Ha et al. | |
| 2007/0064799 A1* | 3/2007 | Ha | 375/240.12 |
| 2009/0010323 A1* | 1/2009 | Su et al. | 375/240.01 |
| 2009/0290643 A1* | 11/2009 | Yang | 375/240.16 |

FOREIGN PATENT DOCUMENTS
WO   WO 2007/047736 A2   4/2007

OTHER PUBLICATIONS
International Search Report for application PCT/KR2007/003950 filed Aug. 17, 2007.

* cited by examiner

*Primary Examiner* — Gims Philippe
*Assistant Examiner* — Richard Carter (57) ABSTRACT

The present invention relates to a method and apparatus for encoding a multi-view video and a method and apparatus for decoding a multi-view video, and more particularly, to a method and apparatus for encoding a multi-view video and a method and apparatus for decoding a multi-view video that can perform encoding and decoding in consideration of global disparity between pictures captured at two different viewpoints to remove spatial redundancy. An embodiment of the invention provides an encoder for compressing data for pictures captured at different viewpoints using global disparity in a multi-view video. The encoder includes: an input unit that receives pictures captured at two or more viewpoints; a reference picture generating unit that generates a new reference picture on the basis of the global disparity between a target picture and a reference picture; and a motion predicting unit that calculates motion vectors of the target picture on the basis of the reference picture.

7 Claims, 8 Drawing Sheets

| region A | region B | region C | region D |

[Fig. 10]

| region A' | region B' | region C' | region D' |

METHOD AND APPARATUS FOR ENCODING OR DECODING FRAMES OF DIFFERENT VIEWS IN MULTIVIEW VIDEO USING GLOBAL DISPARITY

TECHNICAL FIELD

The present invention relates to a method and apparatus for encoding a multi-view video and a method and apparatus for decoding a multi-view video, and more particularly, to a method and apparatus for encoding a multi-view video and a method and apparatus for decoding a multi-view video that can perform encoding and decoding in consideration of global disparity between pictures captured at two different viewpoints to remove spatial redundancy.

BACKGROUND ART

A multi-view video is a set of view images obtained by taking a picture of the same object using a plurality of synchronized cameras (for example, 8 cameras) that are arranged in a line or an arc shape. The multi-view video can be applied to a stereoscopic display apparatus, and enables a viewer to see a stereophonic broadcast, a 3D broadcast, 3D DMB contents, or an FTV (free-view TV) program at his/her desired viewpoint.

Figure 1:
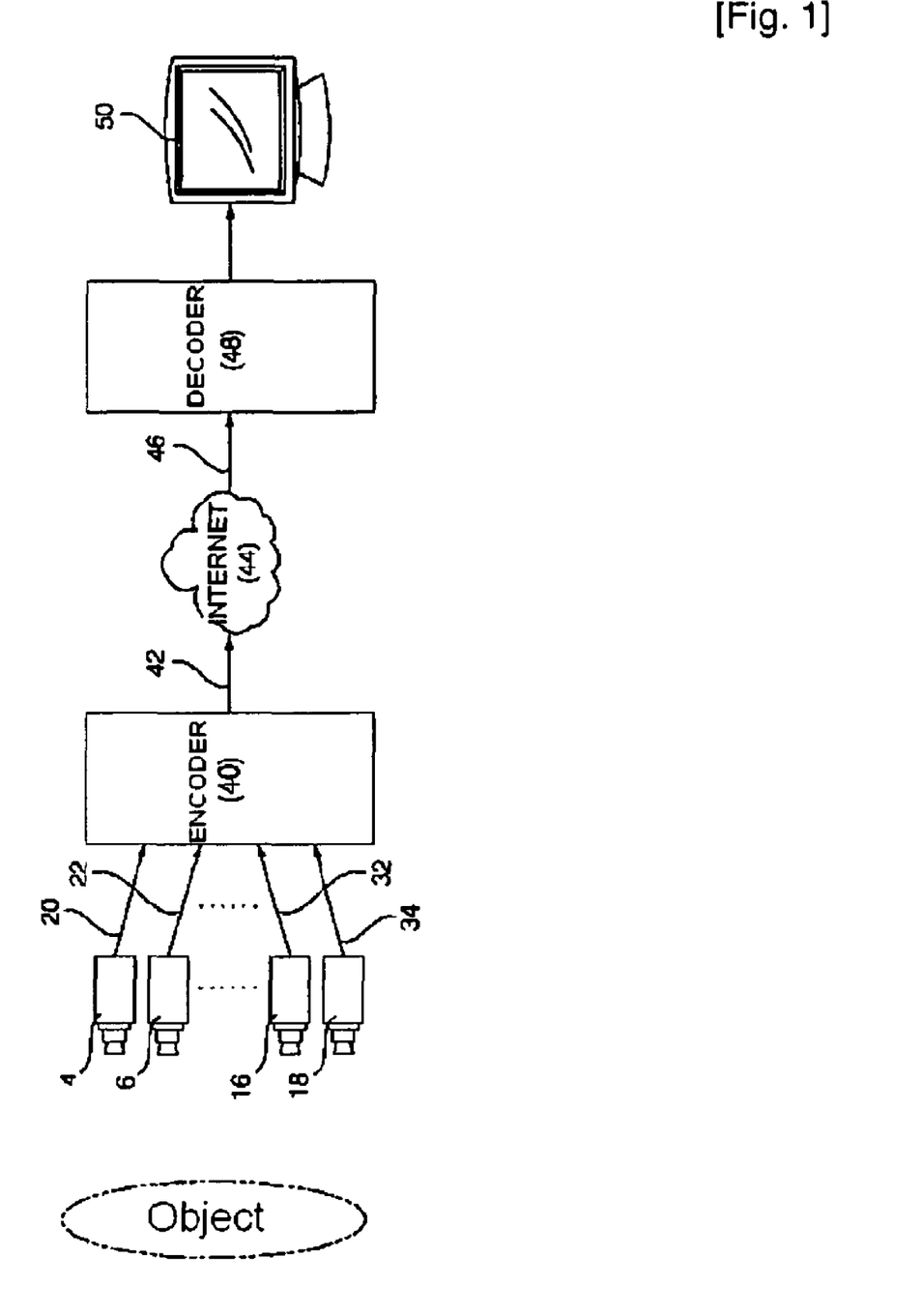
FIG. 1 is a diagram schematically illustrating the structure of a multi-view video system including multi-view video encoder and decoder.

FIG. 1 is a diagram schematically illustrating a general multi-view video transmitting system. In the multi-view video transmitting system, as shown in FIG. 1, a plurality of cameras 4, 6, . . . , 16, 18 capture the images of the same object, and transmit digital or analog image signals to a multi-view video encoder 40 through transmission lines 20, 22, . . . , 32, 34. The multi-view video encoder compresses data, and transmits the compressed data to a multi-view video decoder 48 through a transmission line 42, the Internet 44 or a dedicated data network, and a transmission line 46. The multi-view video decoder 48 decodes the data and outputs all or some of the frames of the multi-view video to an output device, such as a monitor 40.

The pictures of the multi-view video overlap temporally and spatially. Therefore, in order to improve the efficiency of transmission, a general multi-view video encoder performs motion prediction for removing the spatial overlap between pictures at different viewpoints as well as motion prediction in the time direction.

However, in a multi-view video encoder or an encoding method according to the related art, a search range used for predicting a motion is only used to compensate for global disparity between pictures captured at different viewpoints. As a result, the related art has problems in that it requires a lot of time to search the picture and the searching process is not completely performed when the deviation between the pictures at different viewpoints is large, which results in a reduction in encoding efficiency.

DISCLOSURE OF INVENTION

Technical Problem

An object of the invention is to provide an encoder, an encoding method, a decoder, and a decoding method that can detect global disparity between pictures captured at different viewpoints in a multi-view video, and use the calculated global disparity to improve encoding efficiency and decoding efficiency.

Technical Solution

In the invention, global disparity between a picture captured at a viewpoint and a picture captured at another viewpoint is calculated in order to reduce redundancy between the pictures captured at different viewpoints in a multi-view video. Then, the calculated global disparity is compensated to improve the encoding efficiency of the multi-view video. The term 'global disparity' means the deviation between the pictures in the vertical or horizontal direction in a multi-view video due to the difference between the positions of a camera in the vertical or horizontal direction.

In the invention, two methods are used to compensate for the global disparity. A first method is a reference picture moving method, and a second method is an initial search point moving method.

Next, the reference picture moving method according to the invention will be described in detail below. In the reference picture moving method, a video picture at a viewpoint is moved by global disparity values between pictures, and a region of only one picture outside an overlapping region is copied, and the other picture is padded with the copied region, thereby generating a new reference picture. The new reference picture is more similar to a target picture than the original reference picture, and thus it is possible to compress the target picture with a high degree of efficiency.

In the initial search point moving method, when a block of a reference picture corresponding to a block of a target picture is searched in order to encode the pictures captured at two different viewpoints, the block of the reference picture is searched at a position on the reference picture that deviates from the position of the block on the target picture by global disparity values, not at the same position on the reference picture as that on the target picture, thereby compensating for the global disparity between the reference picture and the target picture. That is, when global disparity exists between the reference picture and the target picture, a block similar to the block of the target picture is likely to exist at a position on the reference picture that deviates from the position of the block on the target picture by the global disparity. Therefore, the initial search point moving method searches the block on the reference picture at a position that is moved by the global disparity in consideration of the fact, thereby improving the encoding efficiency of a multi-view video.

The two global disparity compensating methods according to the invention may be used at the same time, but it is preferable to selectively use one of the two global disparity compensating methods.

1. Encoder Using Reference Picture Moving Method

According to an aspect of the invention, there is provided an encoder for compressing data for pictures captured at different viewpoints in a multi-view video using a reference picture moving method. The encoder includes: an input unit that receives pictures captured at two or more viewpoints; a reference picture generating unit that generates a new reference picture on the basis of the global disparity between a target picture and a reference picture; and a motion predicting unit that calculates motion vectors of the target picture on the basis of the reference picture.

In the encoder according to the above-mentioned aspect, the reference picture generating unit may include: a global disparity calculating unit that calculates the global disparity between the target picture and the reference picture; a reference picture moving unit that increases the number of pixels of the reference picture in the horizontal and vertical directions by global disparity values or more in the horizontal and vertical directions that are obtained by the global disparity calculating unit, and moves the reference picture by the global disparity values; and a padding processing unit that pads vacant pixels that are generated due to the movement of the reference picture and an increase in the number of pixels by the reference picture moving unit with the values of adjacent pixels.

In the encoder according to the above-mentioned aspect, the global disparity calculating unit of the reference picture generating unit may receive a second reference picture and calculate global disparity between the second reference picture and the target picture. The reference picture moving unit of the reference picture generating unit may increase the number of pixels of the second reference picture in the horizontal and vertical directions by global disparity values or more in the horizontal and vertical directions that are obtained by the global disparity calculating unit, and move the second reference picture by the global disparity values. The reference picture generating unit may further include an edge copy processing unit that copies the second reference picture or the reference picture, and pad vacant pixels of the reference picture or the second reference picture that are generated due to the movement of the second reference picture and an increase in the number of pixels by the reference picture moving unit with the copied picture.

In the encoder according to the above-mentioned aspect, the reference picture generating unit may further include: an up-sampling unit that performs up-sampling on two pictures in order to accurately calculate global disparity between the two pictures; and a filter that smoothes the reference picture or the second reference picture that is processed by the reference picture moving unit, the edge copy processing unit, and the edge padding processing unit.

In the above-mentioned aspect, the encoder may further include: an image capture buffering unit that captures an input multi-view picture and stores the captured picture; a frame rearranging unit that receives the multi-view pictures from the image capture buffering unit and rearranges the received pictures; a subtracter that calculates the difference between the multi-view picture output from the frame rearranging unit and the reference picture; a DCT unit that performs discrete cosine transform on a matrix of the difference between the pictures that is obtained by the subtracter to obtain a DCT coefficient; a quantizing unit that quantizes the DCT coefficient; and an entropy encoding unit that encodes the quantized DCT coefficient.

2. Encoder Using Initial Search Point Moving Method

According to another aspect of the invention, there is provided an encoder for compressing data for pictures captured at different viewpoints in a multi-view video using an initial search point moving method. The encoder includes: a global disparity calculating unit that calculates global disparity between a target picture and a reference picture, the deviation between the target picture and the reference picture being the minimum when the two pictures overlap each other; and a motion predicting unit that, in order to calculate a motion vector for a block of the target picture with respect to the reference picture, starts searching the block on the reference picture from a position that is moved from the position of the block of the target picture by the global disparity.

In the above-mentioned aspect, the encoder may further include: an image capture buffering unit that captures an input multi-view picture and stores the captured picture; a frame rearranging unit that receives the multi-view pictures from the image capture buffering unit and rearranges the received pictures; a subtracter that calculates the difference between the multi-view picture output from the frame rearranging unit and the reference picture; a DCT unit that performs discrete cosine transform on a matrix of the difference between the pictures that is obtained by the subtracter to obtain a DCT coefficient; a quantizing unit that quantizes the DCT coefficient; and an entropy encoding unit that encodes the quantized DCT coefficient.

3. Encoding Method Using Reference Picture Moving Method

According to still another aspect of the invention, there is provided a method of encoding pictures captured at different viewpoints in a multi-view video using a reference picture moving method. The method includes the steps of: capturing the pictures of the multi-view video and storing the captured pictures; rearranging the pictures of the multi-view video in a predetermined order; moving an encoded reference picture to generate a new reference picture; and calculating a motion vector of a target picture on the basis of the new reference picture.

In the encoding method according to the above-mentioned aspect, the step of generating the new reference picture may include the steps of: calculating global disparity between the target picture and the reference picture; increasing the number of pixels of the reference picture in the horizontal and vertical directions by global disparity values or more in the horizontal and vertical directions, and moving the reference picture by the global disparity values to generate a new reference picture; and padding vacant pixels of the new reference picture with the values of adjacent pixels.

In the above-mentioned aspect, the encoding method may further include the steps of: capturing pictures of a multi-view video and storing the captured pictures; rearranging the stored pictures in a predetermined order; calculating the difference between the rearranged picture and the reference picture; performing discrete cosine transform on a matrix of the difference between the pictures to obtain a DCT coefficient; quantizing the DCT coefficient; and performing entropy encoding on the quantized DCT coefficient.

In the encoding method according to the above-mentioned aspect, in the step of performing the entropy encoding, the motion vector and information on the global disparity between the reference picture and the target picture may be encoded.

In the encoding method according to the above-mentioned aspect, in the step of rearranging the pictures, all of the multi-view pictures captured at a starting time may be arranged in a line, and the pictures captured at each viewpoint may be arranged in a line at predetermined time intervals after the starting time. Then, these processes may be repeatedly performed to arrange the pictures that are captured at all of the viewpoints during all of the times.

According to yet another aspect of the invention, there is provided a storage medium including a program for allowing a computer to execute a method of encoding pictures captured at different viewpoints using global disparity in a multi-view video. The method includes the steps of: capturing the pictures of the multi-view video and storing the captured pictures; rearranging the pictures of the multi-view video in a predetermined order; moving an encoded reference picture to generate a new reference picture; and calculating a motion vector of a target picture on the basis of the new reference picture.

4. Encoding Method Using Initial Search Point Moving Method

According to still yet another aspect of the invention, there is provided a method of encoding pictures captured at different viewpoints in a multi-view video using an initial search point moving method. The method includes the steps of: calculating global disparity between a target picture and a reference picture; and in order to calculate a motion vector for a block of the target picture with respect to the reference picture, starting searching the block on the reference picture from a position that is moved from the position of the block of the target picture by the global disparity.

In the above-mentioned aspect, the encoding method may further include a step of performing entropy encoding on information on the global disparity and the motion vector.

In the encoding method according to the above-mentioned aspect, the step of calculating the global disparity may include a step of performing up-sampling on the reference picture and the target picture.

According to yet still another aspect of the invention, there is provided a storage medium including a program for allowing a computer to execute a method of encoding pictures captured at different viewpoints in a multi-view video using an initial search point moving method. The method includes the steps of: calculating global disparity between a target picture and a reference picture; and in order to calculate a motion vector for a block of the target picture with respect to the reference picture, starting searching the block on the reference picture from a position that is moved from the position of the block of the target picture by the global disparity.

Advantageous Effects

An encoder, an encoding method, a decoder, and a decoding according to the invention encode and decode a multi-view video in consideration of global disparity between pictures captured at different viewpoints, which makes it possible to remove redundancy between the pictures captured at different viewpoints and thus improve the encoding and decoding efficiencies of a multi-view video.

BEST MODE FOR CARRYING OUT THE INVENTION

Hereinafter, an encoder, a method of encoding a multi-view video, a decoder, and a method of decoding a multi-view video according to exemplary embodiments of the invention will be described with reference to the accompanying drawings. The exemplary embodiments of the invention are just illustrative, but the scope of the invention is not limited thereto.

First Embodiment

An encoder for encoding a picture using a reference picture moving method according to a first embodiment of the invention will be described below.

Figure 2:
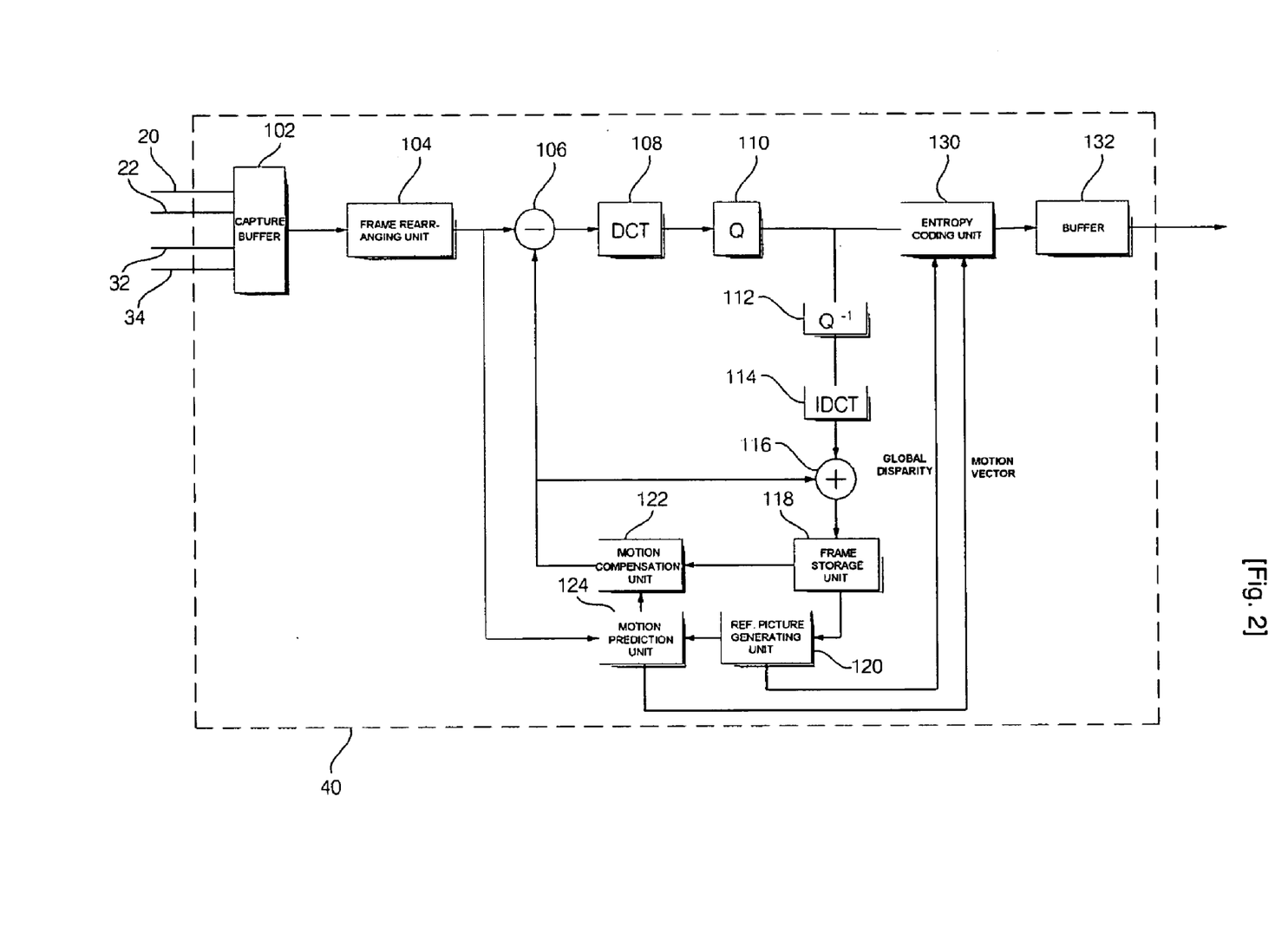
FIG. 2 is a block diagram illustrating the structure of a multi-view video encoder using a reference picture moving method according to a first embodiment of the invention.

FIG. 2 is a block diagram illustrating the structure of an encoder for encoding a multi-view video using the reference picture moving method according to the first embodiment of the invention. Specifically, first, video feeds received from a plurality of cameras shown in FIG. 1 through transmission lines 20, 22, . . . , 32, 34 are input to a capture buffer 102. The capture buffer 102 captures an image from the video feeds transmitted through the transmission lines 20, 22, . . . , 32, 34 and temporarily stores the captured image. In FIG. 2, a frame rearranging unit 104 according to this embodiment accesses the capture buffer 102 in a rearranging order, which will be described later, and provides data for a target picture to a motion predicting unit 124 and a subtracter 106.

A forward path will be described with reference to FIG. 2. Data for a target image that is output from the frame rearranging unit 104 is input to the subtracter 106. The subtracter 106 calculates a matrix of the difference between the target image and a reference image that is reconstructed by a motion compensating unit 122 and transmits the matrix to a DCT unit 108. The DCT unit 108 performs discrete cosine transform on the matrix to obtain a DCT coefficient. A quantizing unit 110 quantizes the DCT coefficient obtained by the DCT unit 108. The quantized DCT coefficient is transmitted to an entropy encoding unit 130 and is then subjected to entropy encoding by, for example, CAVLC (context adaptive variable length codes) or CAVAC (context adaptive binary arithmetic coding). The bits subjected to the entropy encoding are transmitted to an external network through a buffer 132.

Next, a reconstruction path will be described below with reference to FIG. 2. In this embodiment, the data output from the quantizing unit 110 is input to a dequantizing unit 112, an IDCT unit 114, and an adder 116 and is then reconstructed as a picture. Then, the picture is stored in a frame storage unit 118. A reference picture generating unit 120 receives one or two pictures from the frame storage unit 118 and generates a reference picture. The detailed structure and operation of the reference picture generating unit 120 generating the reference picture will be described later. A motion predicting unit 124 uses the generated reference picture to predict the motion of the target picture input from the frame rearranging unit 104, and transmits motion vectors for a block of the target picture to the entropy encoding unit 130. The motion vectors are transmitted from the motion predicting unit 124 to a motion compensating unit 122. In this way, a predicted picture is formed. The subtracter 106 calculates the difference between the predicted picture and the target picture input from the frame rearranging unit 140, and the difference is transmitted to the DCT unit 108, as described above. Data for the picture predicted by the motion compensating unit 122 and information on the matrix of the difference that is reconstructed by the IDCT unit 114 are input to the adder 116, and data for the reconstructed target picture is stored in the frame storage unit 118.

For the purpose of convenience of explanation, FIG. 2 shows only an inter-mode for using the reference picture, but does not show an intra-mode for generating an I picture. However, the encoder according to this embodiment may further include a mode selecting unit that selects one of the inter-mode and the intra-mode, such as in an MPEG-2 or H.264/AVC standard, and an intra-mode unit for generating the I picture.

Figure 3:
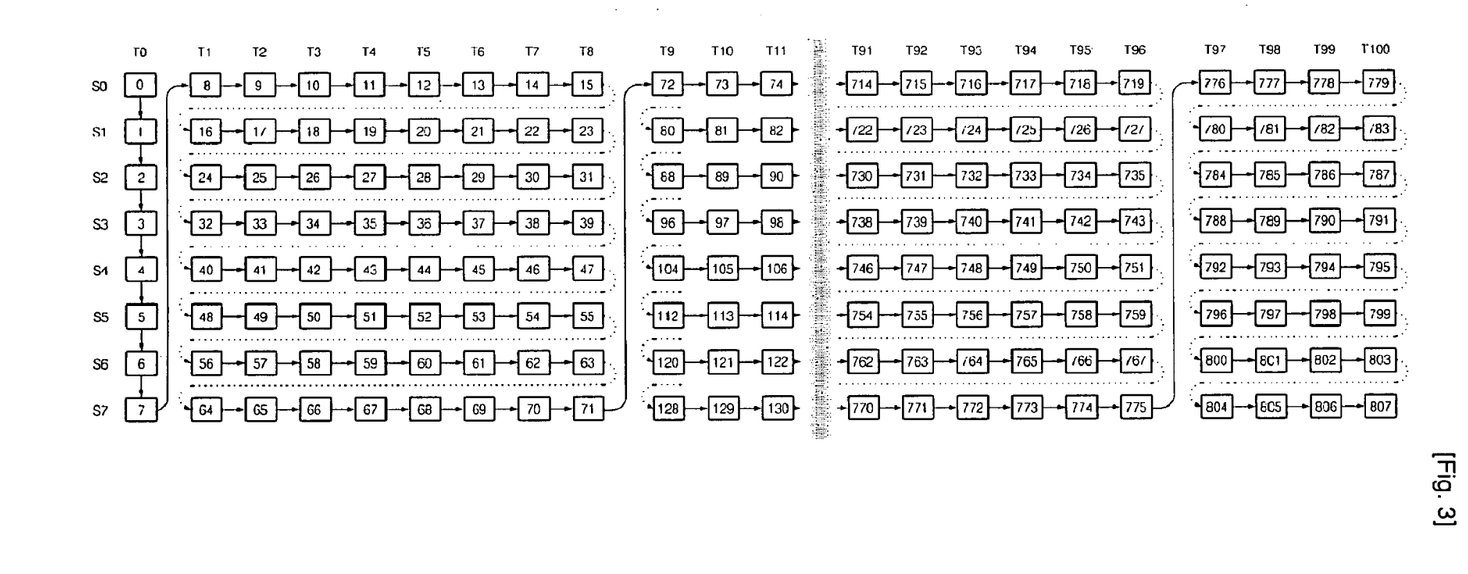
FIG. 3 is a diagram illustrating the rearrangement of multi-view video feeds by a frame rearranging unit according to the first embodiment of the invention.

FIG. 3 is a diagram illustrating the arrangement of pictures of a multi-view video by the frame rearranging unit 104 of the encoder according to the first embodiment of the invention. As shown in FIG. 3, the frame rearranging unit 104 arranges pictures captured at all of the viewpoints S0, S1, ..., S6, S7 at a time T0 in a line, and aligns pictures captured at the first viewpoint S0 during predetermined times T1 to T8. Then, the frame rearranging unit 104 arranges pictures captured at the next viewpoint S1 during the times T1 to T8. This process is repeatedly performed until pictures captured at a viewpoint S7 are arranged in a line during the time T1 to T8. Subsequently, the frame rearranging unit 104 arranges the pictures captured at the viewpoints S0 to S7 during predetermined times T9 to T16 in the same manner as described above.

The method of rearranging pictures as shown in FIG. 3 is used for the current H.264/AVC standard for a multi-view video. Alternatively, pictures may be arranged in a different method from the above-mentioned method of rearranging frames as shown in FIG. 3.

Figure 4:
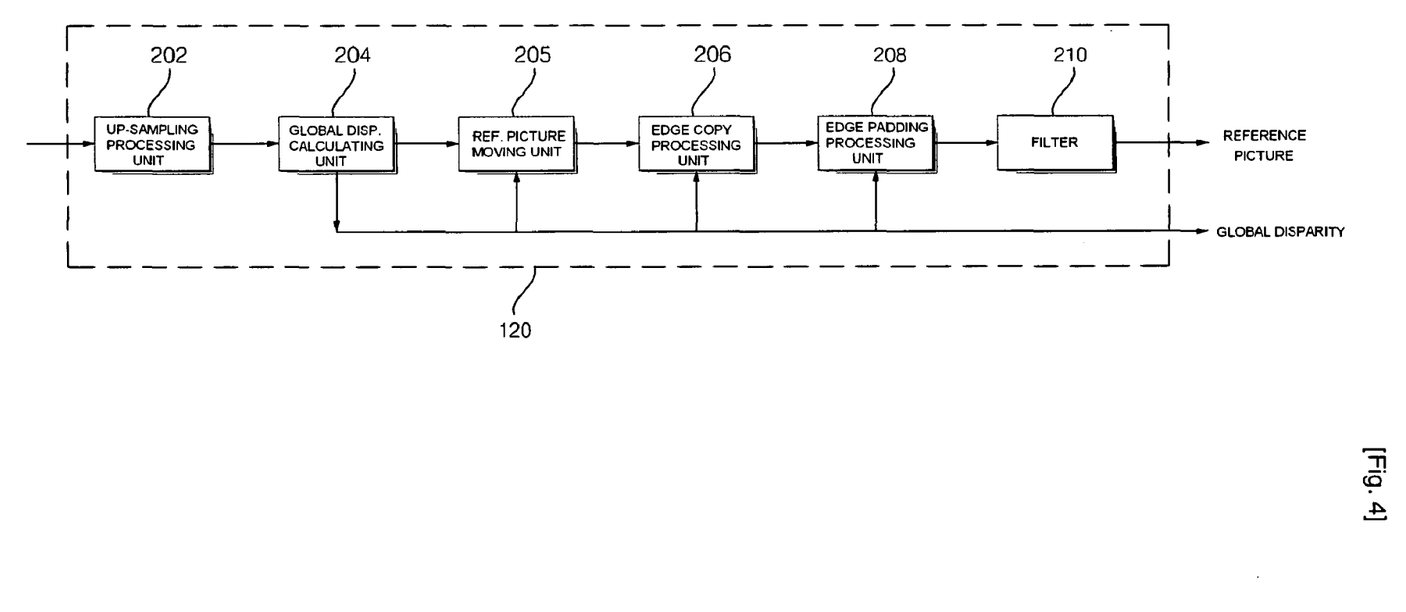
FIG. 4 is a block diagram illustrating the structure of a reference picture generating unit according to the first embodiment of the invention.

Next, the structure of the reference picture generating unit 120 according to the first embodiment will be described in detail below with reference to FIG. 4. The reference picture generating unit 120 according to the first embodiment includes an up-sampling processing unit 202, a global disparity calculating unit 204, a reference picture moving unit 205, an edge copy processing unit 206, an edge padding processing unit 208, and a filter 210.

The up-sampling processing unit 202 of the reference picture generating unit 120 performs up-sampling on a view image that is input to the reference picture generating unit 120. The up-sampling processing unit 202 uses interpolation to enlarge the image four times or sixteen times. The higher the level of up-sampling becomes, the more accurately the global disparity is calculated. However, as the level of up-sampling increases, the amount of computation increases. Therefore, it is preferable to determine the level of up-sampling in consideration of the performance and efficiency of the encoder. The up-sampling method is described in detail in U.S. Pat. No. 6,510,246, and thus a detailed description thereof will be omitted.

In order to calculate global disparity between the target picture and the reference picture, the target picture and the reference picture subjected to up-sampling by the up-sampling processing unit 202 are input to the global disparity calculating unit 204. The global disparity calculating unit 204 performs an operation represented by the following Expression 1 on the luma values of pixels to calculate the global disparity between the target picture and the reference picture.

$$g_{xy} = \min_{x,y} \left[ \frac{\sum_{i,j \in R} |img0(i,j) - img1(i-x, j-y)|}{R} \right] \quad \text{Mathfigure 1}$$

Figure 5:
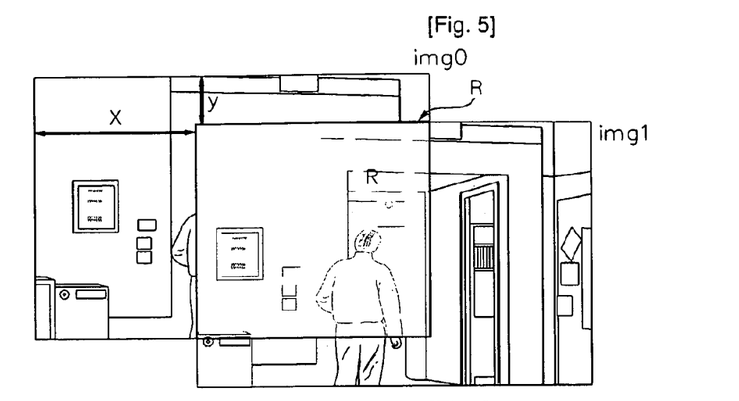
FIGS. 5 and 6 are diagrams illustrating coordinates used to calculate global disparity between two pictures and an overlapping region during the calculating process.

In math FIG. 1, $g_{xy}$ indicates a value obtained by dividing the sum of the differences between the minimum luma values of two different pictures by the area R of an overlapping region between the two pictures, img0(i, j) indicates the luma value of a pixel positioned at coordinates (i, j) on the picture at the first viewpoint, img1(i-x, j-y) indicates the luma value of a pixel at coordinates (i-x, j-y) on the picture at the second viewpoint, and R indicates the area of an overlapping region when the deviation values of two pictures are referred to as x and y (see FIG. 5). The value $g_{xy}$ is obtained by calculating the difference between the luma values of the two pictures for all of the values x and y and by dividing the calculated value by the area R of the overlapping region between the two pictures. The values x and y where the value obtained by dividing the differences between the luma values of all of the pixels by the area R of the overlapping region becomes the minimum are global disparity values ($x_m$, $y_m$) between the two pictures. As described above, since the up-sampling processing unit 202 performs up-sampling on the original picture, the values $x_m$ and ym are calculated for sub-pixels of the original picture, which makes it possible to more accurately calculate the disparity value than the existing method in which the up-sampling process is not performed. The calculated global disparity values ($x_m$, $y_m$) are provided to the reference picture moving unit 205, the edge copy processing unit 206, the edge padding processing unit 208, and the entropy encoding unit 130.

Figure 6:
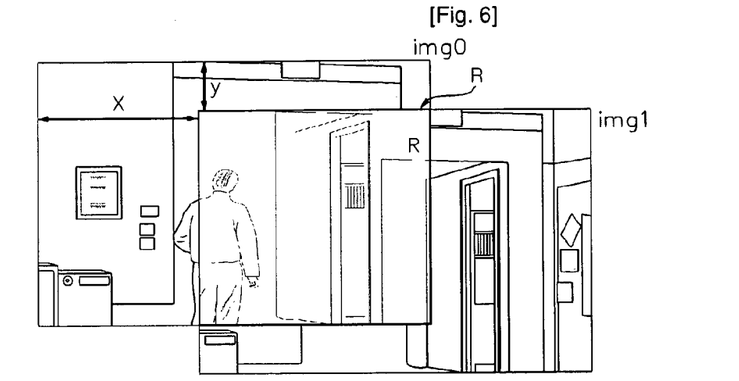

Meanwhile, the calculation of the global disparity may be performed by the original image shown in FIG. 5 or a binary image shown in FIG. 6. The binary image is composed of only black and white, unlike the original image that includes black, white, and gray, which is an intermediate color between the black and white. Therefore, the binary image is less sensitive to a variation in brightness and color, which makes it possible to rapidly and easily search a portion corresponding to a block of the target picture from the reference picture. In this case, the global disparity calculating unit 204 converts the target picture and the reference picture into the binary images, not the original images, and calculates the global disparity therebetween. The other processes for calculating the global disparity are the same as the processes using the original image, and thus a detailed description thereof will be omitted.

After the global disparity calculating unit 204 calculates the global disparity values ($x_m$, $y_m$), the reference picture moving unit 205 increases the number of pixels of the reference picture in the x and y directions to be larger than the global disparity values in the x and y directions, and moves the reference picture by the global disparity values ($x_m$, $y_m$).

Then, a second reference picture is input to the reference picture generating unit 120, and is processed by the up-sampling processing unit 202, the global disparity calculating unit 204, and the reference picture moving unit 205, similar to the reference picture. After the global disparity between the second reference picture and the target picture is calculated, the edge copy processing unit 206 uses the global disparities between the reference picture and the target picture and between the second reference picture and the target picture to copy a non-overlapping region between the reference picture and the second reference picture. If there are vacant pixels that are not covered by the copied reference picture and second reference picture, the edge padding processing unit 208 pads the vacant pixels with the values of adjacent pixels to generate a new reference picture and a new second reference picture.

Next, the operation of the reference picture generating unit 120 generating a new reference picture and a new second reference picture will be described in detail below. First, the up-sampling processing unit 202 performs up-sampling on a target picture, a reference picture, and a second reference picture. Then, the global disparity calculating unit 204 calculates the global disparities between the reference picture and the target picture and between the second reference picture and the target picture.

Figure 7:
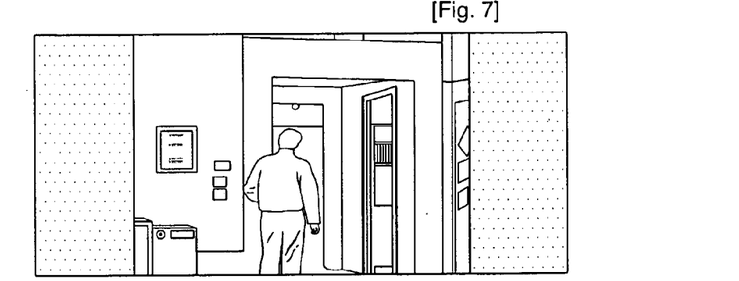
FIGS. 7 and 8 are diagrams illustrating two pixels of the original reference picture of a multi-view video that are extended in the horizontal direction.
Figure 8:
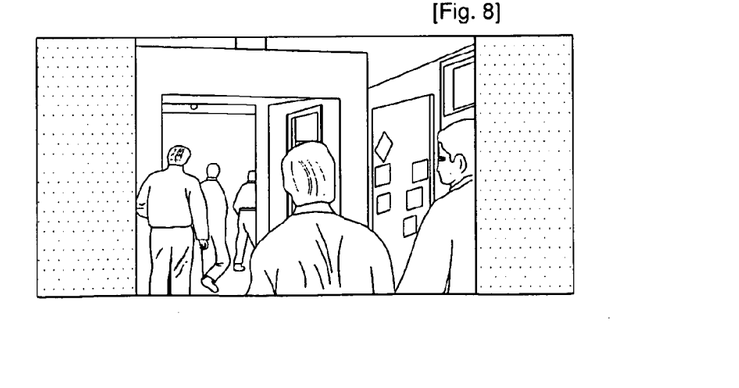
Figure 9:
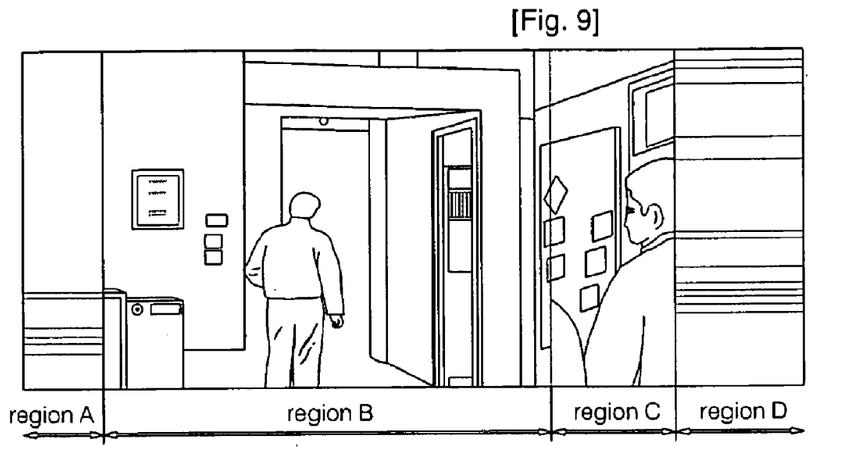
FIGS. 9 and 10 are diagrams illustrating new reference pictures that are generated by compensating for the global disparities of the reference pictures shown in FIGS. 7 and 8, moving the reference pictures, and copying pixels, and padding the reference pictures with the copied pixels.
Figure 10:
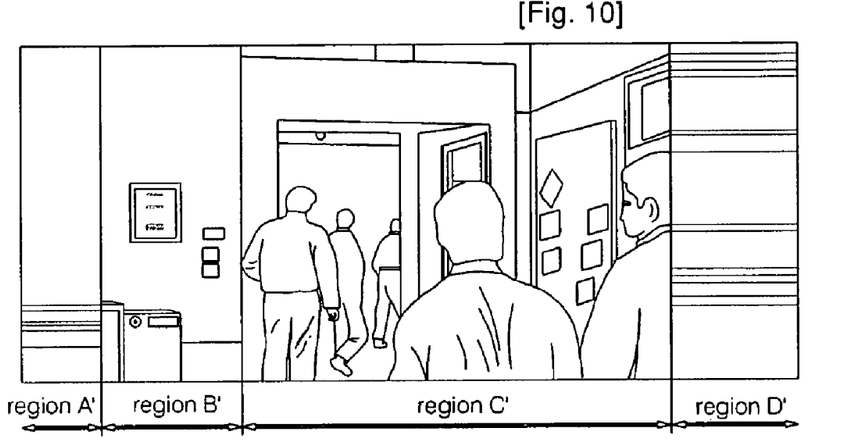
Figure 11:
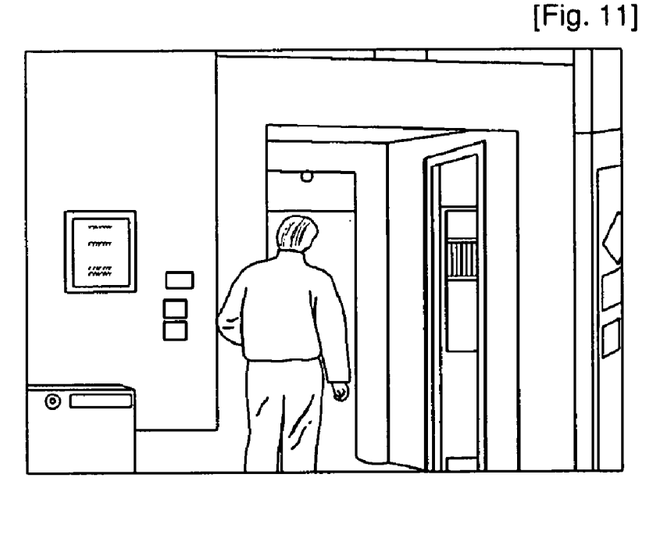
FIG. 11 is a diagram illustrating a target picture for referring to the reference pictures to be encoded, which are shown in FIGS. 9 and 10.

For example, FIGS. 7 and 8 show an enlarged reference picture and an enlarged second reference picture, respectively. FIG. 11 shows a target picture that is encoded into a B picture on the basis of the reference picture and the second reference picture. In FIGS. 7 and 8, since the pixel values of both sides of the picture are not determined before both sides are processed by the edge copy processing unit 206, both sides of the picture are displayed in gray. Then, the reference picture moving unit 205 moves the reference picture and the second reference picture by the global disparities between the target picture and the reference picture and between the target picture and the second reference picture, respectively. The reference picture shown in FIG. 7 is moved to the left side, and the second reference picture shown in FIG. 8 is moved to the right side. The portions moved in FIGS. 7 and 8 are represented by regions B and C' in FIGS. 9 and 10, respectively.

Subsequently, the edge copy processing unit 206 calculates global disparity between the reference picture and the second reference picture on the basis of the global disparity between the reference picture and the target picture and the global disparity between the second reference picture and the target picture. The edge copy processing unit 206 uses the calculated global disparity between the reference figure and the second reference picture to copy a region that appears on the reference picture, but does not appear on the second reference picture and a region that appears on the second reference picture but does not appear on the reference picture to the second reference picture and the reference picture, respectively. The copied regions correspond to a region C shown in FIG. 9 and a region B' shown in FIG. 10.

For vacant pixels on the reference picture and the second reference picture that are not covered with the copied regions of the reference picture and the second reference picture, the edge padding processing unit 208 pads the vacant pixels with the values of adjacent pixels. The padded regions are represented by regions A and D in FIG. 9 and regions A' and D' in FIG. 10.

The reference picture and the second reference picture output from the edge padding processing unit 208 pass through the filter 210, which is the last stage of the reference picture generating unit 120. The reference picture and the second reference picture passing through the filter 210 are smoothed. The filter 210 smoothes regions of the picture that is discontinuously and rapidly changed by the edge copy processing unit 206 and the edge padding processing unit 208.

In this embodiment, the reference picture, the second reference picture, and the target picture generated by the reference picture generating unit 120 are input to the motion predicting unit 124 of the encoder 40. The motion predicting unit 124 calculates motion vectors of the target picture shown in FIG. 11, on the basis of the reference picture and the second reference picture, and transmits the motion vectors to the entropy encoding unit 130 and the motion compensating unit 122 of the encoder 40.

In this embodiment, in order to prevent confusion, only the horizontal global disparity occurs between the reference pictures shown in FIGS. 7 and 8 and the target picture shown in FIG. 11. However, if vertical global disparity exists between the target picture and the reference picture, the copied region and the padded region exist in the vertical direction as well as in the horizontal direction.

Further, in this embodiment, two reference pictures are used in order to encode the picture shown in FIG. 11 into a B picture. However, the invention can be applied to the structure in which a target picture is composed of a P picture, not the B picture. In this case, one reference picture, not two reference pictures, is used, global disparity between the target picture and the reference picture is calculated, and only the padding process is performed on the reference and target pictures, without performing a copying process.

Second Embodiment

Figure 12:
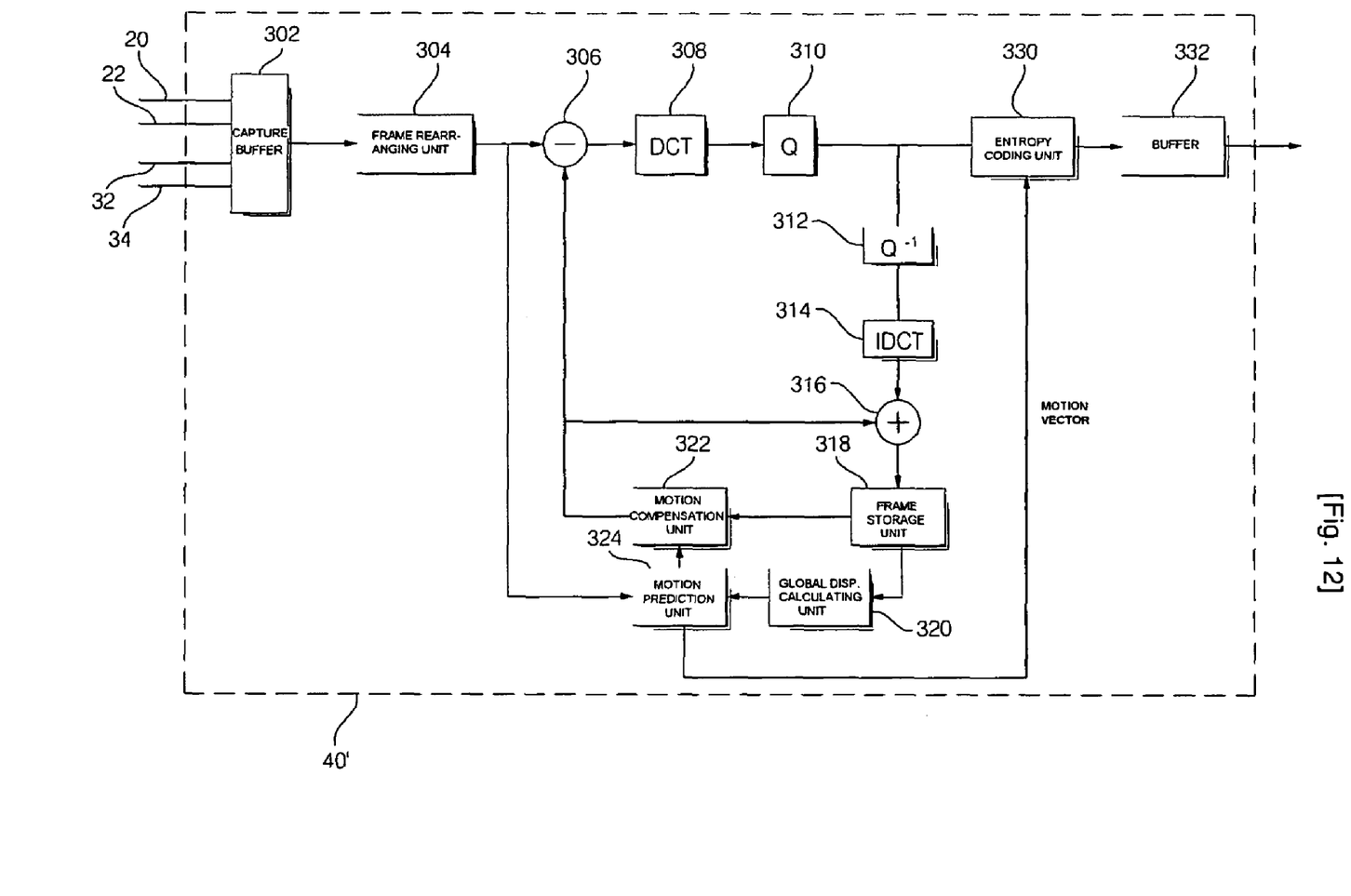
FIG. 12 is a block diagram illustrating the structure of a multi-view video encoder using an initial search point moving method according to a second embodiment of the invention.

Next, an encoder for encoding a picture using an initial search point moving method according to a second embodiment of the invention will be described below. FIG. 12 is a block diagram illustrating the structure of an encoder 40' according to the second embodiment of the invention. As can be seen from FIG. 12, the structure of the encoder 40' according to the second embodiment is similar to that of the encoder 40 shown in FIG. 2 according to the first embodiment except that a global disparity calculating unit 320 is provided instead of the reference picture generating unit 120.

In the second embodiment, a capture buffer 302, a frame rearranging unit 304, a subtracter 306, a DCT unit 308, a quantizing unit 310, a dequantizing unit 312, an IDCT unit 314, an adder 316, a frame storage unit 318, a motion compensating unit 322, an entropy encoding unit 330, and a buffer 332 have the same structure and function as those in the first embodiment, and thus a detailed description thereof will be omitted.

In the second embodiment, the global disparity calculating unit 320 is the same structure and function as the global disparity calculating unit 204 of the reference picture generating unit 210 according to the first embodiment. That is, the global disparity calculating unit 320 calculates global disparity values $(x_m, y_m)$ between a target picture and a reference picture. The calculate global disparity values $(x_m, y_m)$ is transmitted to the motion predicting unit 324, and is used to calculate motion vectors of the target picture. In the second embodiment, the global disparity calculating unit 320 may use a binary image, instead of the original image, in order to calculate the global disparity, similar to the first embodiment.

Figure 13:
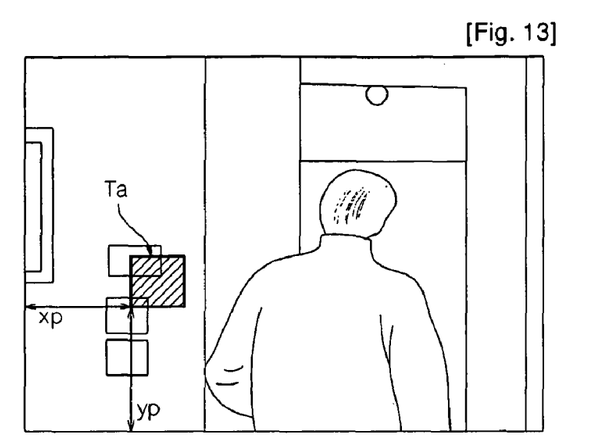
FIGS. 13 and 14 are diagrams illustrating a process of searching a block on the reference picture while referring to a block of the target picture using the initial search point moving method.
Figure 14:
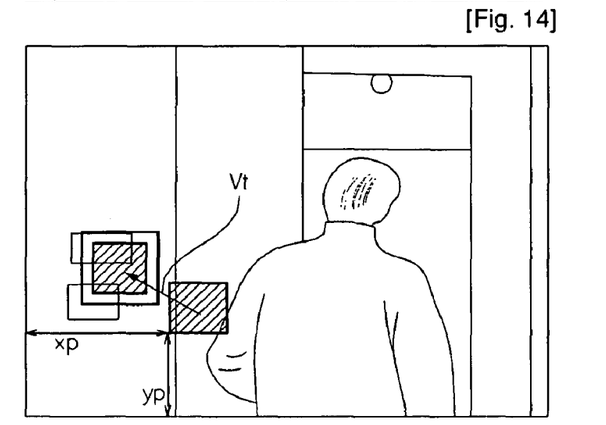

FIG. 13 shows an encoded target picture, and in FIG. 11A, a block Ta is positioned at coordinates (xp, yp) on the picture as using the lower left corner as the origin. FIG. 14 shows an encoded target picture. As can be seen from FIG. 14, the reference picture deviates in the right direction from the target picture shown in FIG. 13.

When a searching process is performed with reference to the block Ta of the target picture by a conventional method, the searching process starts at the same position as that on the target picture in FIG. 14, that is, at coordinates (xp, yp) from the lower left corner of the reference picture. However, since the target picture deviates from the reference picture by the global disparity values $(x_m, y_m)$, the block Ta will be searched at a position on the reference picture that is spaced from the position on the target picture by a global disparity vector Vt.

Therefore, in the second embodiment, the motion predicting unit 324 of the encoder 40' starts searching a block on the target picture from the reference picture at a position that deviates from the reference picture by the global disparity vector Vt. In this case, even when the global disparity value is large, it is possible to rapidly and accurately search a corresponding block on the reference picture within a predetermined search range Sb since the search position is moved in consideration of the global disparity.

Meanwhile, in the second embodiment, global disparity information from the global disparity calculating unit 320 is transmitted to only the motion predicting unit 324, but the invention is not limited thereto. The global disparity information may also be transmitted to the entropy encoding unit 330. In this case, the motion predicting unit 324 may provide a vector value obtained by subtracting global disparity from a motion vector to the entropy encoding unit 330. This structure can reduce the magnitude of a motion vector, and thus improve coding efficiency.

The encoder or an apparatus for performing an encoding method according to the invention may be composed of a dedicated apparatus formed of a single integrated circuit or a plurality of integrated circuits. Alternatively, it may be realized by installing programs for performing the encoding method to a general-purpose computer.

Next, a decoder and a decoding method according to a third embodiment of the invention will be described below.

Figure 15:
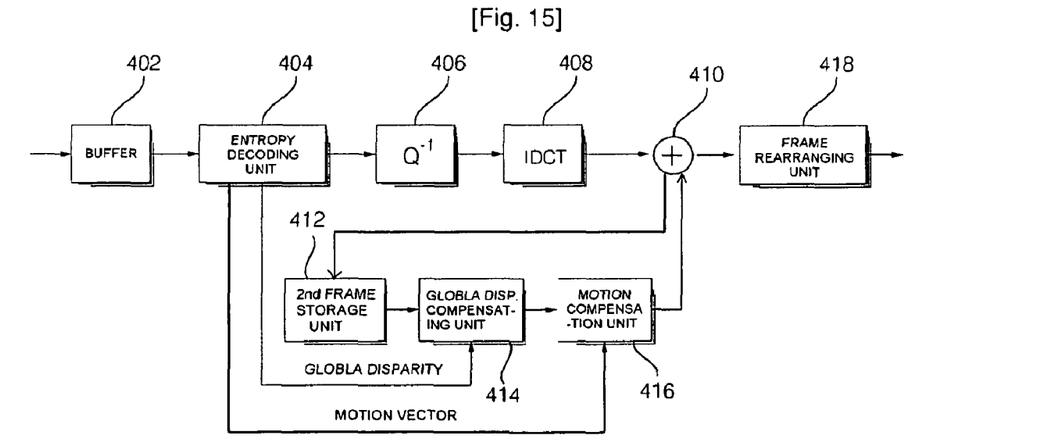
FIG. 15 is a block diagram illustrating the structure of a multi-view video decoder according to an embodiment of the invention.

FIG. 15 is a block diagram illustrating a multi-view video decoder according to a third embodiment of the invention. The decoder shown in FIG. 15 can be applied to the first and second embodiments, and will be described below. In order to distinguish a frame storage unit of the decoder from the frame storage unit 118 of the encoder, the frame storage unit of the decoder is referred to as a 'second frame storage unit 412'.

As shown in FIG. 15, the multi-view video decoder according to the third embodiment of the invention includes a buffer 402, an entropy decoding unit 404, a dequantizing unit 406, an IDCT unit 408, an adder 410, a second frame storage unit 412, a global disparity compensating unit 414, a motion compensating unit 416, and a frame rearranging unit 418.

The buffer 402 temporarily stores encoding data transmitted through transmission media, and transmits the encoding data to the entropy decoding unit 404. The transmitted encoding data corresponds to a bit string that is encoded by the encoder according to the above-described embodiments of the invention. The encoding data includes header information and residual information. The header information includes data for the size of a sequence, a picture type (an I, P, or B picture), a macro block mode, a motion vector, and global disparity information. The residual information includes data obtained through the forward path of the encoder, that is, data obtained by encoding the difference between a target picture and a reconstructed reference picture.

The entropy decoding unit 404 performs entropy decoding on the encoding data transmitted from the buffer 402. The entropy decoding unit 404 decodes the residual information and transmits the decoded information to the dequantizing unit 406. In addition, the entropy decoding unit 404 decodes the header information (particularly, a motion vector and global disparity information) and transmits the decoded information to the global disparity compensating unit 414 and the motion compensating unit 416.

Next, a forward path according to this embodiment will be described below with reference to FIG. 15. The residual information decoded by the entropy decoding unit 404 is input to the dequantizing unit 406. The dequantizing unit 406 dequantizes the residual information and outputs it to the IDCT unit 408. The IDCT unit 408 performs inverse discrete cosine transform to convert a frequency component into a pixel component. The residual information subjected to inverse discrete cosine transform by the IDCT unit 408 is input to the adder 410. The adder 410 adds the residual information to the picture subjected to the global disparity compensating process and the motion compensating process to generate a predicted frame, and transmits the predicted frame to the frame rearranging unit 418. The frame rearranging unit 418 rearranges the frames transmitted from the adder 410 in order to display the frames in the temporal order, in the same manner as that in which the encoder rearranges the pictures in order to perform encoding. Although not shown in the drawings, the frames rearranged by the frame rearranging unit 418 are displayed on a display medium.

Next, a reconstruction path according to the embodiment will be described with reference to FIG. 15. The final decoding picture formed by the adder 410 is stored in the second frame storage unit 412. The global disparity compensating unit 414 and the motion compensating unit 416 perform global disparity compensation and motion compensation on the final decoding picture stored in the second frame storage unit 412, respectively. The global disparity compensating unit 414 receives the global disparity information decoded by the entropy decoding unit 404, and performs global disparity compensation on the received information. The motion compensating unit 416 receives the motion vector decoded by the entropy decoding unit 404 and performs motion compensation on the received motion vector. Specifically, the global disparity compensating unit 414 reads out the picture stored in the second frame storage unit 412 and compensates for the global disparity of the picture using the transmitted global disparity information, similar to the encoder that uses the reference picture moving method or the initial search point moving method to compensate for the global disparity to form a new reference picture. Then, the frame subjected to the global disparity compensation is input to the motion compensating unit 416. The motion compensating unit 416 receives from the entropy decoding unit 404 the motion vector that is calculated by the encoder using the compensation of the global disparity, and performs motion compensation on the frame subjected to the global disparity compensation. The predicted picture subjected to motion compensation is input to the adder 410, and the adder 410 adds the predicted picture and the residual information. Then, the adder 410 transmits the added information to the second frame storage unit 412.

Next, a decoding method according to a fourth embodiment of the invention will be described below.

I) In the forward path, the decoding method according to this embodiment includes: storing data that is transmitted through a transmission medium; perform entropy decoding on the data; dequantizing residual information subjected to the entropy decoding; performing IDCT on the dequantized residual information; adding a picture subjected to global disparity compensation and motion compensation to the residual information subjected to the IDCT; and sequentially rearranging final decoding pictures having the residual information added thereto. II) In the reconstruction path, the decoding method according to this embodiment includes: compensating for global disparity using global disparity information subjected to entropy decoding; compensating for a motion using motion vectors subjected to the entropy decoding; and storing a final decoding picture that is formed by adding the picture subjected to motion compensation to the residual information. In the decoding method, the data subjected to the entropy decoding includes the motion vector and the global disparity information. Since each of the processes of the decoding method has been described in the structure of the decoder, a detailed description thereof will be omitted.

Each of the decoder and an apparatus for performing the decoding method according to the above-described embodiments of the invention may be composed of a dedicated apparatus formed of a single integrated circuit or a plurality of integrated circuits. Alternatively, it may be realized by installing programs for performing the encoding method to a general-purpose computer.

Industrial Applicability

The invention can be used for multi-view video encoder and decoder.

The invention claimed is:

1. An encoder for compressing data for pictures captured at different viewpoints using global disparity in a multi-view video, comprising:
an input unit configured to receive pictures captured at two or more viewpoints;
a reference picture generating unit configured to generate a new reference picture on the basis of global disparity between a target picture and a reference picture; and
a motion predicting unit configured to calculate motion vectors of the target picture on the basis of the new reference picture,
wherein the reference picture generating unit comprises:
a global disparity calculating unit configured to receive the reference picture and calculate a first global disparity between the target picture and the reference picture, and receive a second reference picture and calculate a second global disparity between the second reference picture and the target picture;
a reference picture moving unit configured to increase a number of pixels of the reference picture in horizontal and vertical directions by the first global disparity or more and move the reference picture by the first global disparity, and configured to increase the number of pixels of the second reference picture in the horizontal and vertical directions by the second global disparity or more and move the second reference picture by the second global disparity;
an edge copy processing unit configured to copy a non-overlapping region between the reference picture and the second reference picture; and
a padding processing unit configured to pad vacant pixels of the increased reference picture or the increased second reference picture, which is generated due to the movement of the reference picture or the second reference picture and an increase in the number of pixels by the reference picture moving unit, with values of pixels in the copied region to generate the new reference picture or a new second reference picture.

2. The encoder of claim 1, wherein the reference picture generating unit further includes:
an up-sampling unit configured to perform up-sampling on the reference picture or the second reference picture and the target picture in order to calculate the first or second global disparity; and
a filter configured to smooth the reference picture or the second reference picture that is processed by the reference picture moving unit, the edge copy processing unit, and the edge padding processing unit.

3. The encoder of claim 1, further comprising:
an image capture buffering unit configured to capture an input picture and store the captured picture;
a frame rearranging unit configured to receive multi-view pictures from the image capture buffering unit and rearrange the received pictures;
a subtracter configured to calculate a difference between the multi-view picture output from the frame rearranging unit and the reference picture;
a DCT unit configured to perform discrete cosine transform on a matrix of the difference between the pictures that is obtained by the subtracter to obtain a DCT coefficient;
a quantizing unit configured to quantize the DCT coefficient; and
an entropy encoding unit configured to encode the quantized DCT coefficient.

4. A method of encoding pictures captured at different viewpoints using global disparity in a multi-view video, the method comprising:
capturing pictures of the multi-view video and storing the captured pictures;
rearranging the pictures of the multi-view video in a predetermined order;
moving a reference picture to generate a new reference picture using global disparity between a target picture and the reference picture; and
calculating a motion vector of the target picture on the basis of the new reference picture,
wherein the generating of the new reference picture comprises:
receiving the reference picture and a second reference picture;
calculating the global disparity between the target picture and the reference picture and global disparity between the target picture and the second reference picture;
increasing a number of pixels of the reference picture in horizontal and vertical directions by the global disparity or more, and moving the reference picture by the global disparity;
increasing a number of pixels of the second reference picture in the horizontal and vertical directions by the second global disparity or more, and moving the second reference picture by the second global disparity;
copying a non-overlapping region between the reference picture and the second reference picture; and
padding vacant pixels of the increased reference picture or the increased second reference picture, which is generated by movement of the reference picture or the second reference picture and the increase in the number of pixels, with values of pixels in the copied region being used to generate the new reference picture or a new second reference picture.

5. The encoding method of claim 4, further comprising:
calculating a difference between the rearranged pictures and the reference picture;

performing discrete cosine transform on a matrix of the difference between the pictures to obtain a DCT coefficient;

quantizing the DCT coefficient; and performing entropy encoding on the quantized DCT coefficient.

6. The encoding method of claim 5, wherein, in the performing of the entropy encoding, the motion vector and information on the global disparity between the reference picture and the target picture are encoded.

7. The encoding method of claim 6, wherein the rearranging of the pictures comprises a first process of arranging pictures captured at a starting time in a line, and a second process of arranging pictures captured at each viewpoint in a line at predetermined time intervals after the starting time, and wherein the first and second processes are repeatedly performed to arrange the pictures that are captured at all of the viewpoints during all of the times.

* * * * *